UNITED STATES PATENT OFFICE.

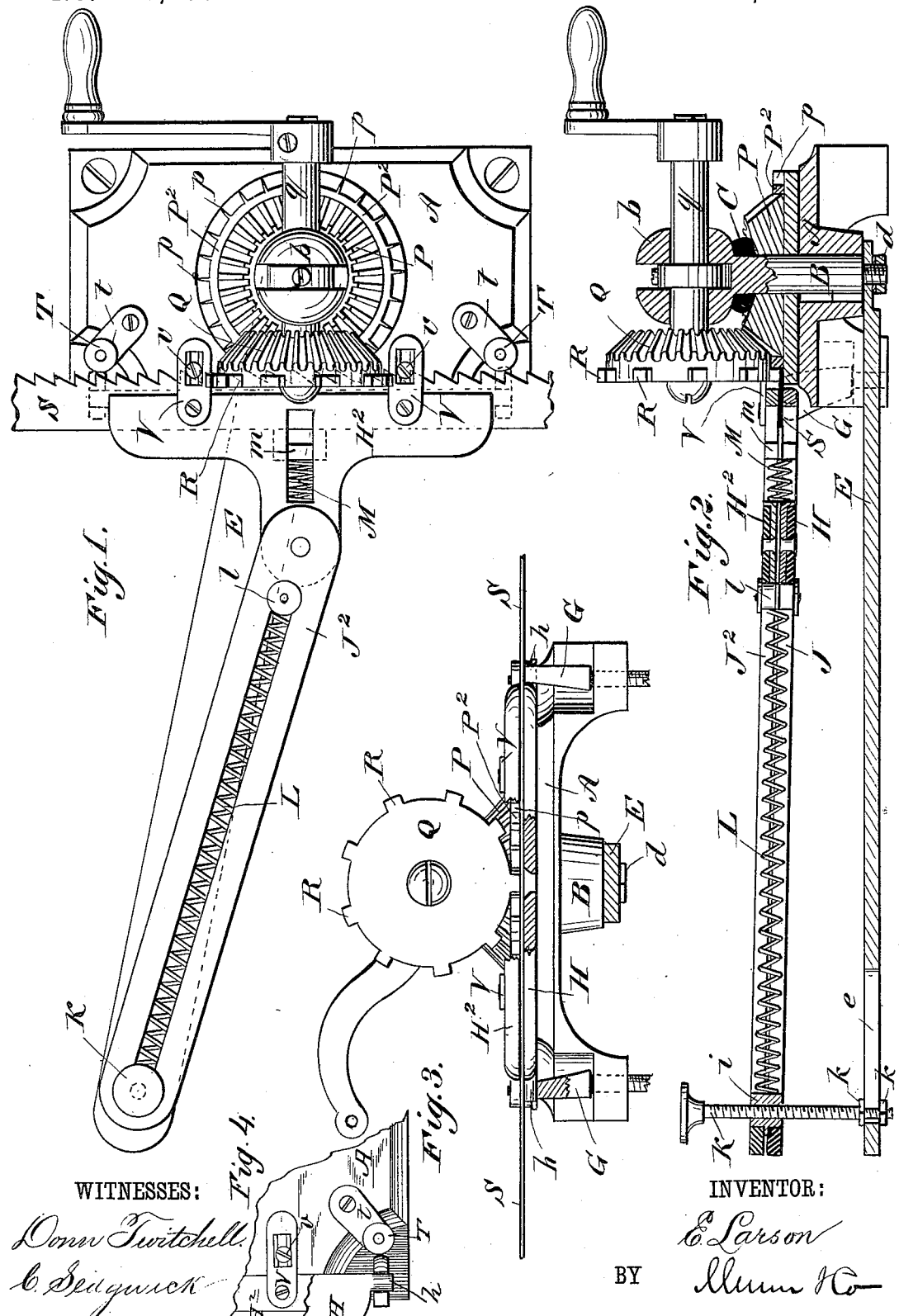

EMANUEL LARSON, OF SOUTH PUEBLO, COLORADO.

SAW-SET.

SPECIFICATION forming part of Letters Patent No. 249,639, dated November 15, 1881.

Application filed May 25, 1881. (Model.)

*To all whom it may concern:*

Be it known that I, EMANUEL LARSON, of South Pueblo, in the county of Pueblo and State of Colorado, have invented a new and useful Improvement in Saw-Sets, of which the following is a full, clear, and exact description.

My invention relates to a mode of setting saw-teeth by means of rotating wheels provided with projections for engagement with the teeth of the saw.

The invention consists in a novel construction, arrangement, and combination of wheels, gearing, and clamping and adjusting devices, as hereinafter more particularly described and set forth.

In the accompanying drawings, Figure 1 is a top view of a machine embodying my improvements. Fig. 2 is a longitudinal vertical section, and Fig. 3 a transverse vertical section. Fig. 4 is a detailed view of one of the trunnions supporting the jaws H.

Similar letters of reference indicate corresponding parts.

The working parts of the machine are supported by a base or platform, consisting of a plate, A, which is screwed or otherwise secured to a table or bench.

In the center of the plate A is a vertical pivot, B, having a knob or enlargement, $b$, at its upper end, under which is a rubber ring or washer, C. The lower end of the pivot is screw-threaded, and is provided with a nut, $d$, through which and the bottom of the plate A the pivot B passes, said pivot also passing through one end of a bar, E, which is provided with a slot, $e$, near its outer end.

At two corners of the plate A are inserted two screws, G G, in the tops of which are recesses, forming bearings for trunnions or pivots $h$ at the ends of the lower jaw, H, of the saw-clamp. The upper jaw, $H^2$, corresponds in shape with the lower one, with the exception of the trunnions, and each jaw has a lip or lug extending from its rear edge. The lip of the lower jaw is pivoted to the inner end of a bar, J, and the lip of the upper jaw to a similar bar, $J^2$. The outer ends of these bars are connected together and provided with a nut, $i$, in which works a screw, K, provided with a head or knob for turning it. The lower end of the screw K works in the slot $e$ in the bar J, and is provided with washers $k\ k$ above and below said bar. In the two bars or double bar J $J^2$ is a slot extending from the nut $i$ to the point of junction of the bars with the clamping-jaws. In this slot works a spiral spring, L, one end of which bears against the nut $i$, and the other end is provided with a follower, $l$. In each clamping-jaw is a slot, in which works a shorter spring, M, provided with a follower, $m$.

On the top of the plate A rests a bevel-gear wheel, P, through which the pivot B passes, with the washer C between said wheel and the knob $b$. This wheel P carries a ring, $P^2$, having teeth $p$ extending radially from its periphery.

In the knob or enlargement $b$ is journaled a crank-shaft, $q$, the inner end of which carries a bevel-gear wheel, Q, engaging with the gear-wheel P. On the periphery of the wheel Q are studs or projections R.

The saw S is clamped between the jaws H $H^2$, with its teeth in line with the studs or projections R, and bearing against two rubber rollers, T, carried by adjustable arms $t$ on the top of the plate A. On turning the shaft $q$ the saw is set by the action of the studs or projections R, which press the saw-teeth down between the teeth $p$ of the ring $P^2$, which teeth $p$ engage with the saw-teeth and move the saw longitudinally between the clamping-jaws as the setting process continues.

To the upper jaw, $H^2$, are attached two bars, V, which project over the base or plate A, and are provided with slots, through which screws $v$ pass into said plate. By means of these bars and screws and the screw K the pitch of the set may be regulated. By turning the screw K in one direction the double bar J $J^2$ is elevated, and by turning it in the opposite direction said double bar is lowered, and the inclination of the saw-clamp corresponds with that of the double bar. By tightening or loosening the screws $v$ to correspond with the adjustment of the screw K the clamp is held steadily in position.

When the saw is in place in the clamp it is held against the rubber rollers T by the pressure of the spring against it. When the saw-blade is narrow the spring M and follower $m$ are used, and when the blade is wide the small spring is removed and the pressure is applied by the spring L.

When the bars E and J² are moved to the right or left the screw K slides in the slot $e$. By this motion the pressure of the spring on the back of the saw-blade is lessened.

By means of the rubber washer C and the nut $d$ the wheel Q may be adjusted nearer to or farther from the wheel P, in order to correspond with different thicknesses of saws.

Having thus described my invention, I claim as new and desire to secure by Letters Patent—

1. The combination of the plate A, pivot B, and beveled-gear wheels Q and P, provided with the projections R and P², and actuated by the crank-shaft $q$, whereby the saw is moved and set, substantially as shown and described.

2. The combination, with the base A, pivot B, and wheels P Q, of the rubber washer C and nut $d$, substantially as and for the purpose herein described.

3. The combination, with the base A and pivot B, of the bar E, screw K, double bar J J², and clamp H H², substantially as herein described.

4. The combination, with the double bar J J² and clamp H H², of the springs L and M and their followers $l\ m$, substantially as and for the purpose herein described.

5. The combination, with the plate A, of the saw-clamp consisting of the two jaws H H², the lower of which is provided with trunnions $h$ at its ends, and the screws G, whereby the saw is adjustably held while being moved and set.

6. The combination, with the double bar J J² and saw-clamp H H², of the screw K, and the slotted bars V, and screws $v$, substantially as and for the purpose herein described.

EMANUEL LARSON.

Witnesses:
N. P. RICHARDS,
H. A. HAYNES.